United States Patent [19]

Bartley

[11] 4,282,952
[45] Aug. 11, 1981

[54] WHEEL ASSEMBLY

[75] Inventor: Francis A. Bartley, Tulsa, Okla.

[73] Assignee: Paccar Inc., Bellevue, Wash.

[21] Appl. No.: 40,419

[22] Filed: May 18, 1979

Related U.S. Application Data

[63] Continuation-in-part of Ser. No. 846,926, Oct. 31, 1977, abandoned.

[51] Int. Cl.³ .......................................... F16D 55/22
[52] U.S. Cl. .................. 188/18 A; 301/6 E
[58] Field of Search .................. 188/18 A, 72.1, 72.4, 188/366–368, 218 XL; 301/6 R, 6 E

[56] References Cited

U.S. PATENT DOCUMENTS

| 3,405,784 | 10/1968 | Henry-Biabaud | 188/18 A |
| 3,780,834 | 12/1973 | Lottridg et al. | 188/18 A |
| 3,941,221 | 3/1976 | Pringle | 188/218 XL |

Primary Examiner—Duane A. Reger
Attorney, Agent, or Firm—Harness, Dickey & Pierce

[57] ABSTRACT

Several embodiments of a wheel assembly for use with large, off-highway vehicles, comprising a drive motor mounted on the wheel hub, and brake calipers cooperating with an annular brake disc supported by a disc carrier which is "outboard" or disposed radially outwardly of the brake calipers, for providing greater heat dissipation and greater braking forces upon the application of braking pressure. In one embodiment, the brake disc is secured to the carrier at its outer periphery by a plurality of circumferentially spaced bolts. In two other embodiments, the brake disc is mounted for limited relative movement with respect to the carrier to accommodate radial and circumferential thermal expansion and contraction in aggravated situations. In one of these other embodiments, the brake disc is retained against excessive circumferential movement relative to the carrier by a plurality of individual lugs affixed to the carrier. In the last embodiment, such movement is prevented by lugs formed integrally with a ring element secured to the carrier.

19 Claims, 12 Drawing Figures

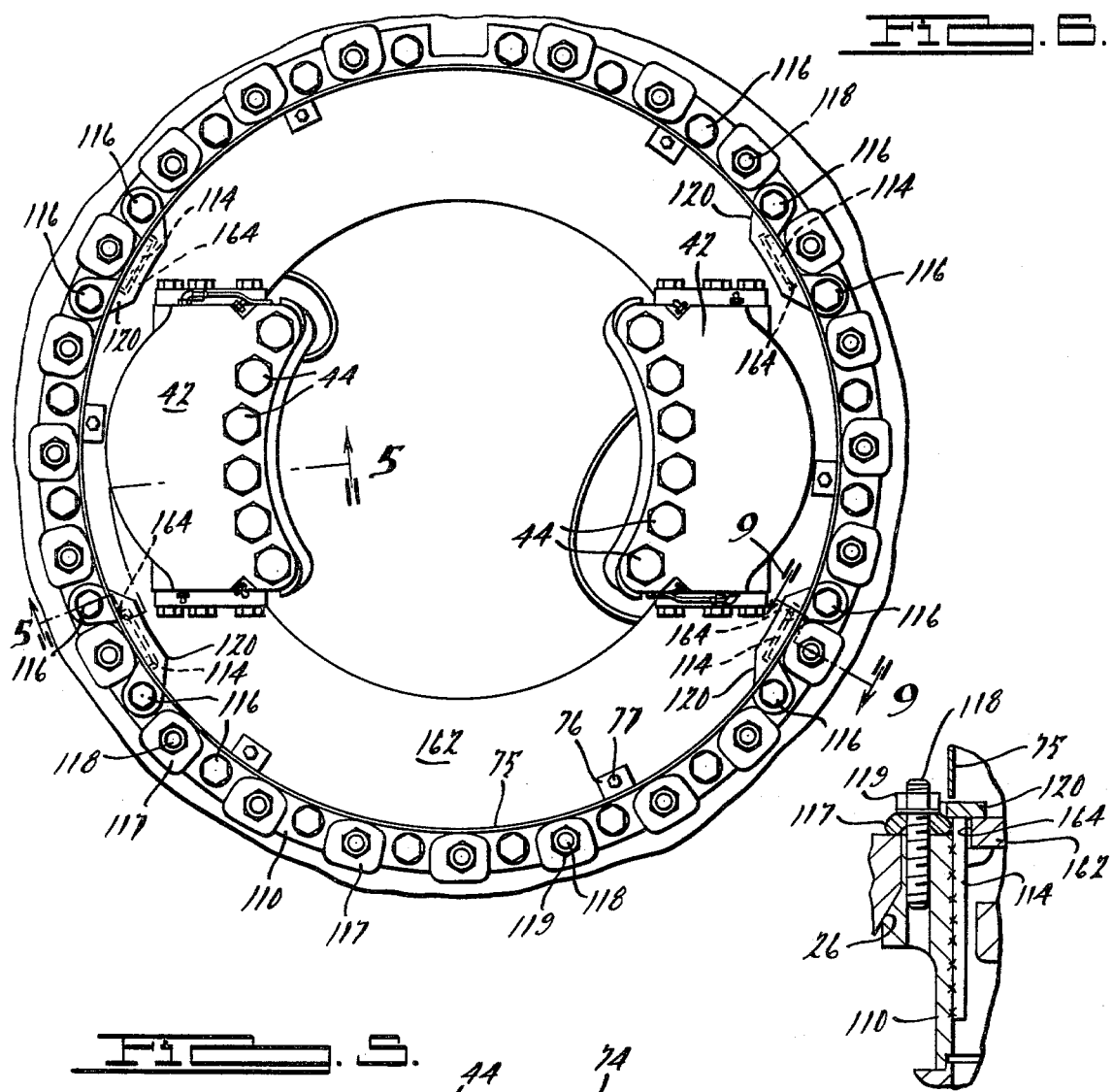
FIG. 8.
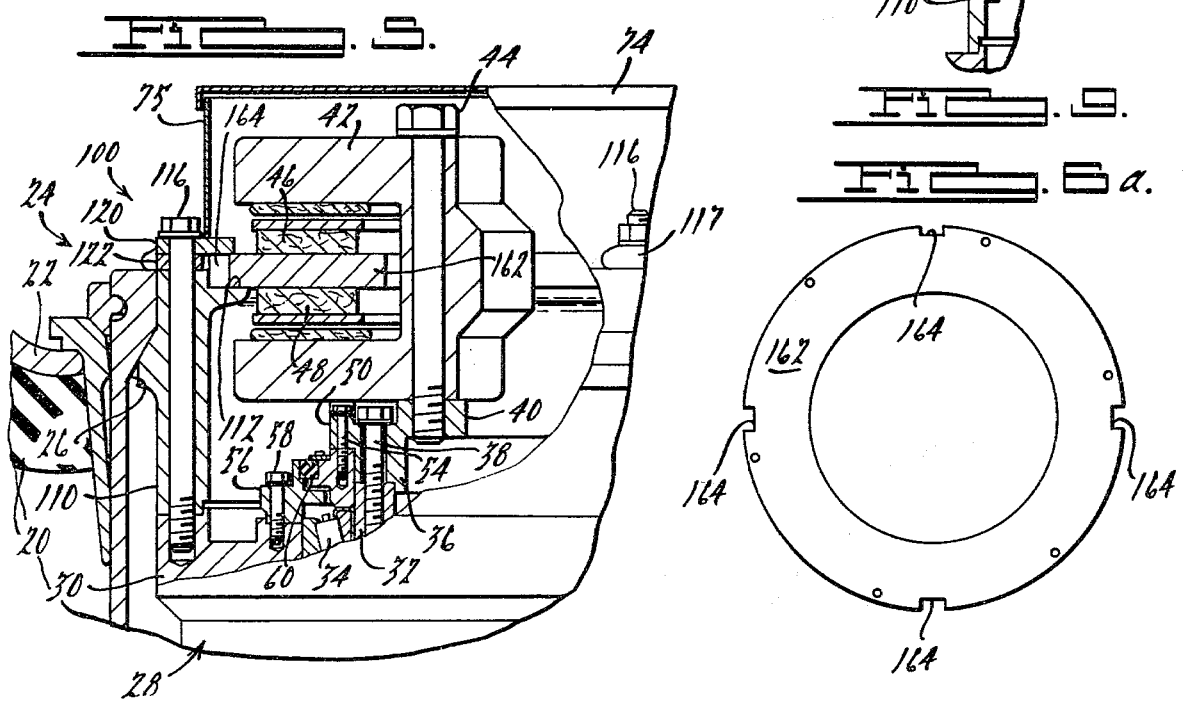
FIG. 5.
FIG. 9.
FIG. 8a.

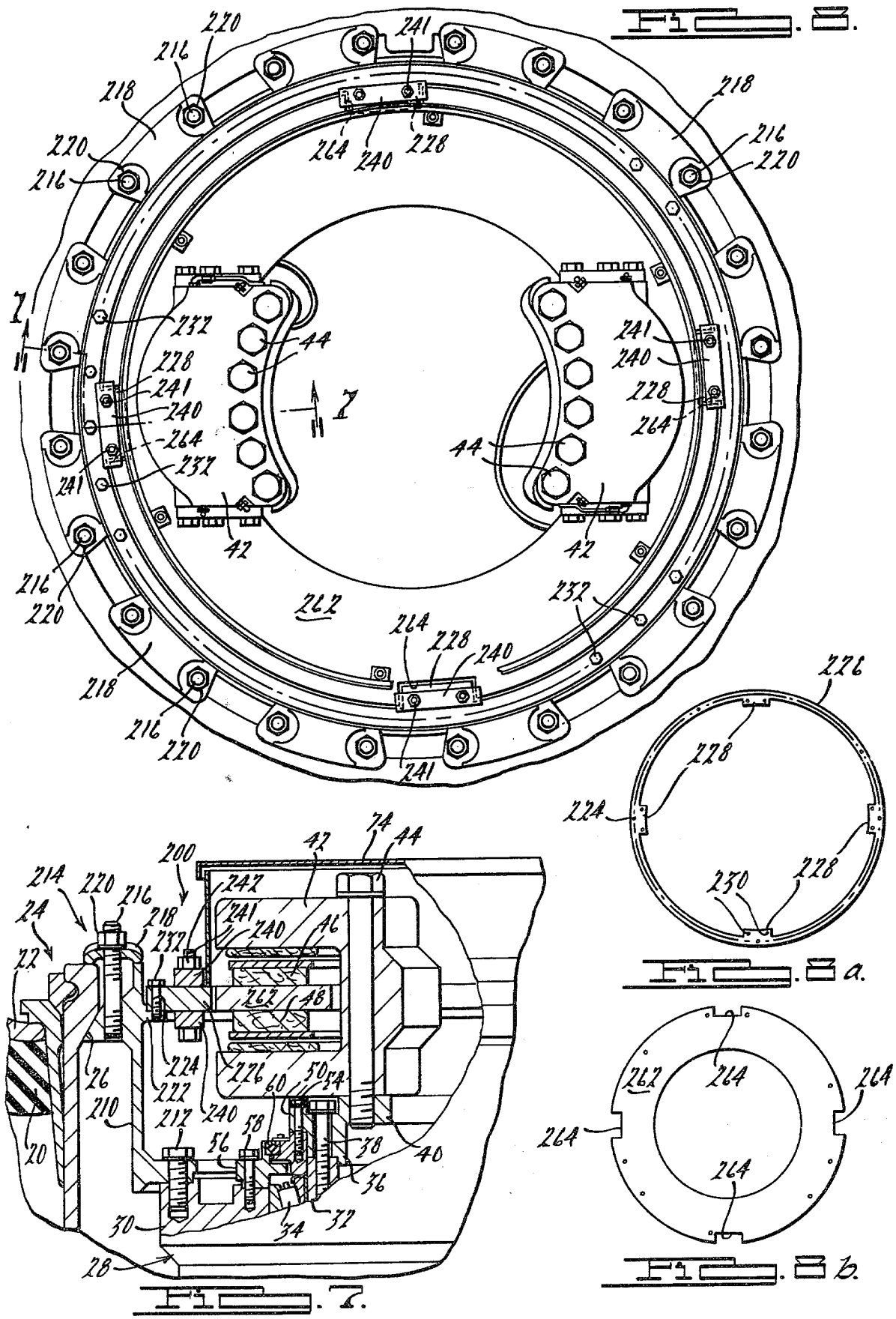

WHEEL ASSEMBLY

REFERENCE TO RELATED APPLICATION

This application is a continuation-in-part of Ser. No. 846,926, filed Oct. 31, 1977, now abandoned.

BACKGROUND OF THE INVENTION

This invention relates to improvements in braking apparatus and more particularly, but not by way of limitation, to an improved disc brake assembly for off-highway vehicles having very large wheels.

Extremely large off-highway vehicles are becoming widely used in many industries, such as in the mining industry, the large construction industry, and the like. The excessive size and weight of these vehicles has created many problems in the construction and operation thereof for both efficiency and safety purposes. Of course, the wheels of these vehicles are exceptionally large, usually requiring tires in excess of ten feet in diameter. It is frequently advantageous to mount at least the front wheels of the vehicle independently, and it is preferable to provide a disc brake system for each wheel, operable independently of one another. During a braking operation, it has been found that the disc generates a considerable amount of heat, and the metallic material from which the disc is constructed frequently "seizes" the elements to which it is secured, or fuses thereto, and as a consequence, it is difficult, if not impossible, to remove the disc for replacement or repair. Usually, the disc is completely destroyed during removal thereof, which is an obvious disadvantage. In order to remedy this difficulty, an annular groove is frequently provided on the opposite faces of the brake disc in order to dissipate the heat. In actual use, however, it has been found that the groove disposed inboard or on the engaging face of the disc is less effective for heat dissipation than originally thought, since it is covered by the braking surface of the stationary brake elements, and the outboard groove is so far removed from the heating area that effective heat dissipation is difficult. In addition, the driving wheels of these large vehicles are frequently powered by a wheel motor disposed within a wheel rim and the brake disc is often operably connected with the armature of the motor. Because the armature is connected to the wheel through a gear train, the brake disc is caused to rotate at a relatively high rate of speed, or a high RPM. Thus, considerable braking effort is necessary for an efficient braking operation, and the truck may be vulnerable to a brake failure due to a gear train failure.

Furthermore, during severe conditions of usage, disc brakes can get extremely hot, after which they subsequently cool between uses. In aggravated situations, this activity results in substantial expansion and contraction, and if the disc is rigidly attached at its outer periphery by bolting or such, this expansion and contraction can result in broken or warped parts.

SUMMARY OF THE INVENTION

The present invention resides in several embodiments of a novel disc brake and wheel assembly particularly designed and constructed for overcoming the foregoing disadvantages in the braking systems of off-highway vehicles, to improve overall braking efficiency, and to eliminate problems of broken or warped parts due to expansion and contraction of the brake disc. Each embodiment illustrated herein generally comprises an annular brake disc member mounted on carrier means secured to a rotatable wheel hub disposed outboard, i.e., radially outwardly, of stationary brake calipers and cooperating therewith to provide braking action for the vehicle. Since the brake disc is disposed radially outwardly of the brake calipers and axially outwardly of the stationary wheel hub, there is considerably greater heat dissipation. In addition, the brake disc is carried by the vehicle wheel and rotatable simultaneously therewith. Thus, the brake disc rotates at a relatively low RPM or at least at a lower rotational speed than that in a conventional armature-type disc brake mounting arrangement, the lower rotational speed of the disc greatly increasing the braking efficiency. Furthermore, the radially outward position of the brake disc provides more operable space for the brake disc, which results in a greater braking area and also increases the braking efficiency. All the embodiments of the novel braking apparatus disclosed herein are simple and efficient in operation and economical and durable in construction.

In two of the illustrated embodiments of the present invention, expansion and contraction of the brake disc is greatly alleviated by having the disc supported for limited radial and circumferential movement, so as to reduce the chance of warping or breakage of either the disc or other parts in severe usage situations.

BRIEF DESCRIPTION OF THE DRAWINGS

FIG. 5 is a front elevational view, partly in section, of an alternative embodiment of the present invention;

FIG. 6 is a side elevational view of the embodiment shown in FIG. 5 with parts removed;

FIG. 6a is a side elevational view of the brake disc of FIG. 6 removed from the assembly of FIG. 6;

FIG. 7 is a front elevational view, partly in section, of another alternative embodiment of the present invention;

FIG. 8 is a side elevational front view of the embodiment illustrated in FIG. 7;

FIG. 8a is a side elevational view of the disc carrier of FIG. 8 removed from the assembly;

FIG. 8b is a side elevational view of the brake disc of FIG. 8 removed from the assembly; and FIG. 9 is a view looking from line 9—9 of FIG. 6.

DETAILED DESCRIPTION OF THE PREFERRED EMBODIMENT

Figure 1:
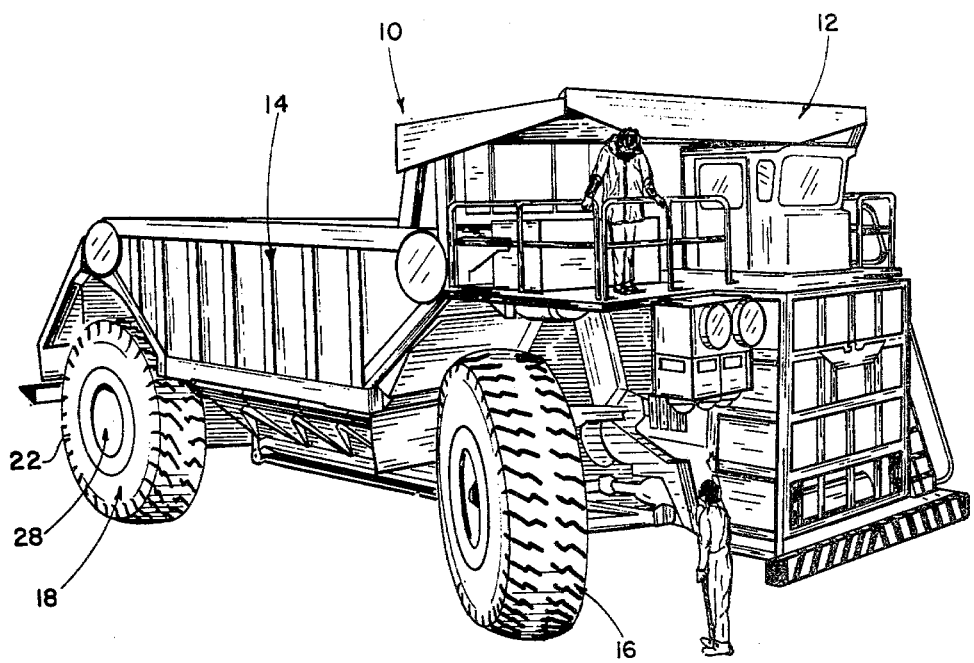
FIG. 1 is a right front perspective view of an off-highway vehicle of the type with which a braking apparatus embodying the invention may be utilized.
Figure 2:
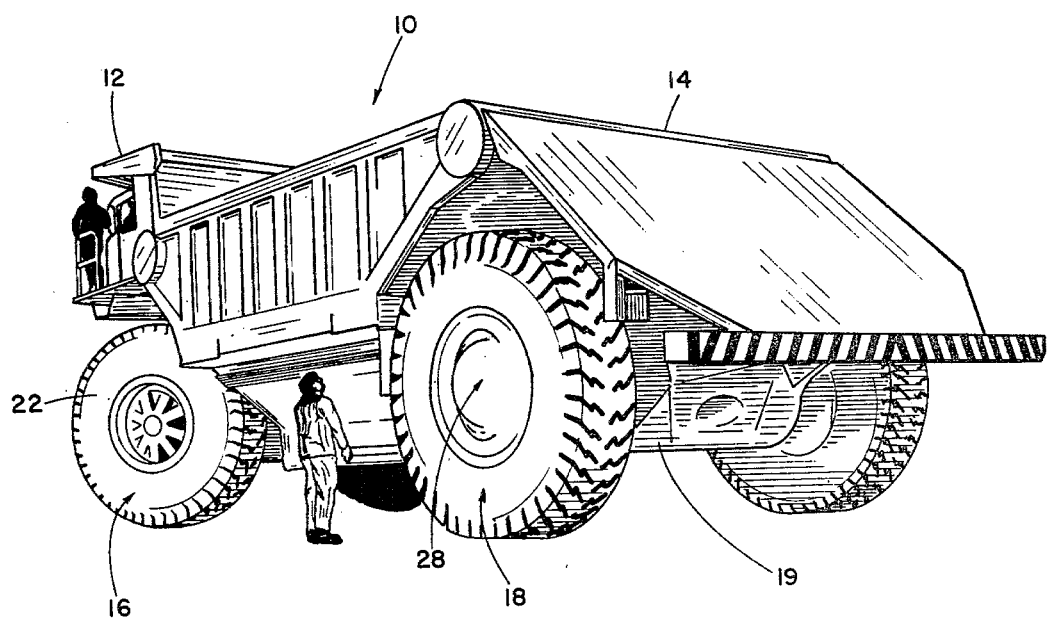
FIG. 2 is a left rear perspective view of the vehicle shown in FIG. 1.

Referring to the drawings in detail, reference character 10 generally indicates an off-highway vehicle comprising a cab section 12, a dump body 14, a pair of front wheels 16 independently mounted on the opposite sides of the cab section 12 in any suitable manner, as is well known, and a pair of rear wheels 18 preferably journalled on the opposite ends of a common axle 19, but not limited thereto. In the particular embodiment depicted herein, each of the rear wheels 18 is driven by a suitable electric motor 28 centrally mounted within the wheel 18, as is well known in this type of vehicle. The front wheels 16 in the embodiment depicted herein, however, are steering wheels and are usually not power-driven wheels.

Figure 3:
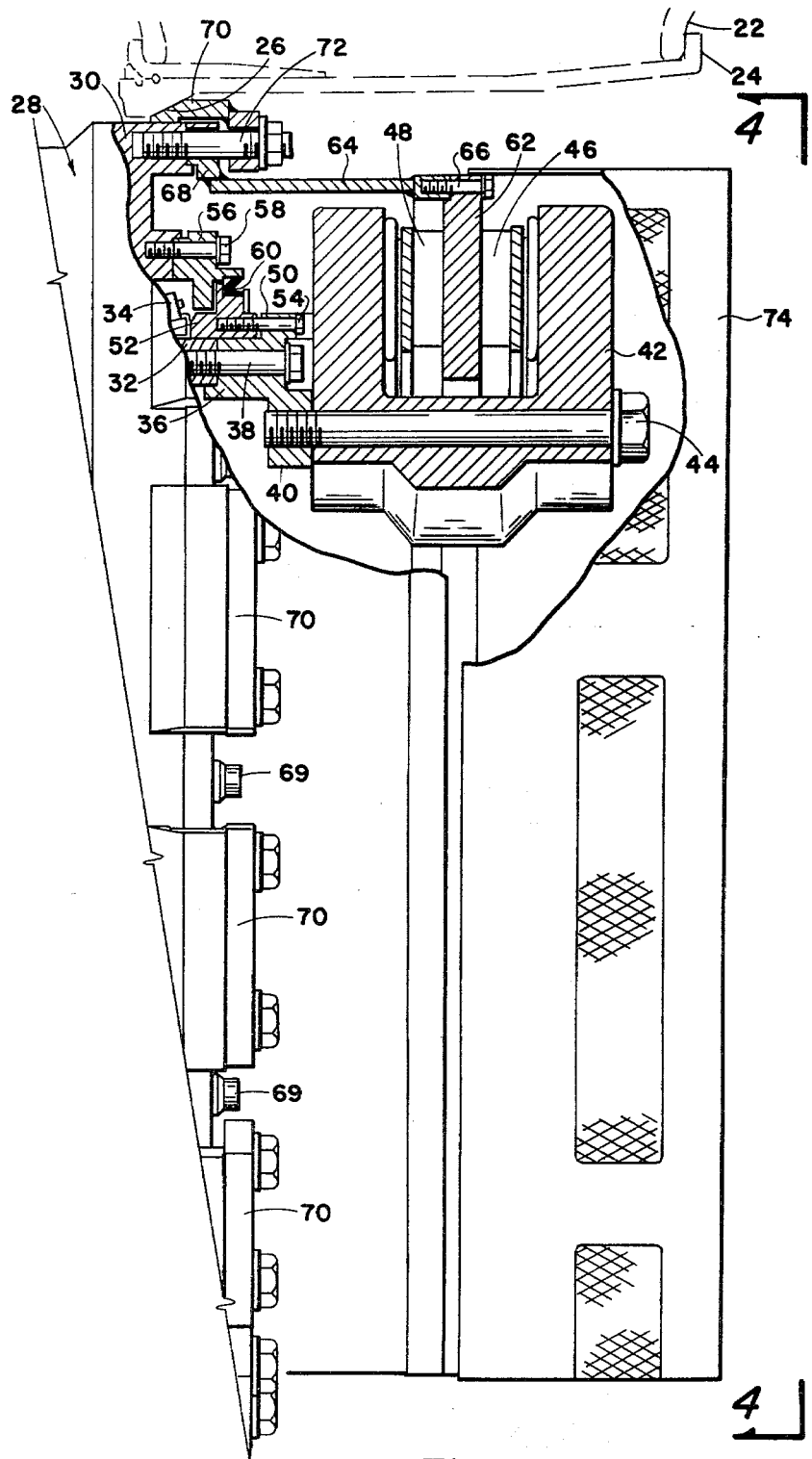
FIG. 3 is a front elevational view, partly in section, of a brake apparatus embodying the invention.

Each wheel, such as the wheel 18, comprises a tire (not shown in FIGS. 1-4) and an annular tire retainer 22 disposed around the outer periphery of the wheel rim 24, as particularly shown in FIGS. 5 and 7. Referring to FIG. 3, the wheel rim 24 may be of any suitable type, and normally includes an inwardly directed angularly disposed annular shoulder 26 extending around the inner periphery thereof for a purpose as will be hereinafter set forth. A suitable wheel motor generally indicated at 28 is centrally disposed within the rim 24 and is substantially concentrically arranged with respect thereto, as is well known. The motor 28 is normally provided with a wheel hub element 30 around the outer periphery thereof engageable with the inner periphery of the wheel rim 24 and rotatable simultaneously therewith. The wheel hub 30 is journalled on or around a non-rotatable central core or housing 32 by suitable bearing means 34 (a relatively small portion of the housing 32 and bearing means 34 being shown in FIG. 3), whereby the hub 30 and rim 24 are freely rotatable with respect to the housing 32. The housing 32 is preferably secured to the rear axle 19 in any suitable manner (not shown) as is well known.

Figure 4:
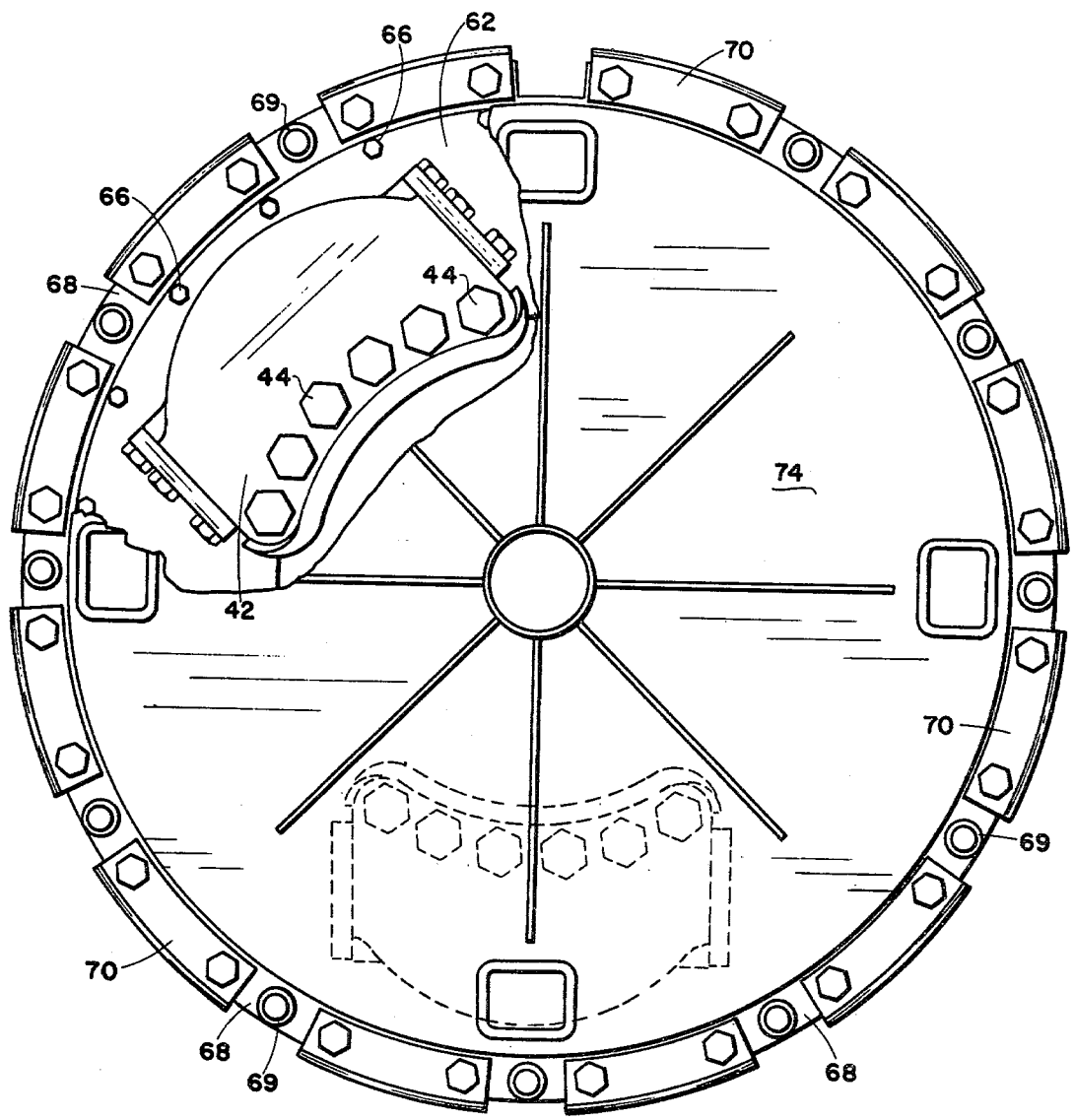
FIG. 4 is a view looking from line 4—4 of FIG. 3, with a portion cut away for purposes of illustration.

An adapter ring 36 (FIG. 3) is bolted, or otherwise secured to the outer end of the housing 32 by suitable bolts 38 and is provided with a radially inwardly directed circumferential flange 40 for supporting a plurality of spaced brake calipers 42. As shown in FIG. 4, it may be preferable to provide two of the calipers 42, but there is no intention of limiting the number of calipers to the particular number shown herein. The calipers may be secured to the flange 40 in any suitable manner, such as by a plurality of bolts 44, and are provided with a spaced brake element 46 and 48 selectively movable in directions toward and away from each other for the application of and release of braking pressure, as is well known. The calipers 42 are particularly arranged whereby the space between the braking elements 46 and 48 is open at the outer periphery of the calipers 42 for a purpose as will be hereinafter set forth.

The ring 36 is provided with a radially outwardly extending circumferential flange 50 shown in FIG. 3. A thrust ring 52 is disposed around the outer periphery of the housing 32 and is secured to the flange 50 by a plurality of circumferentially spaced bolts 54. The adapter ring 36, thrust ring 52 and the calipers 42 are held stationary with the housing 32, whereas the wheel hub 30 is rotatable about the central axis of the motor 28. A bearing cap ring 56 is secured to the outer face of the wheel hub 30 by a plurality of circumferentially spaced bolts 58, and is rotatable simultaneously therewith. A suitable dynamic sealing ring 60 is interposed between the thrust ring 52 and the bearing ring 56.

An annular brake disc 62 is interposed between the brake elements 46 and 48 and extends radially outwardly therefrom. The disc 62 is removably secured to a substantially cylindrical brake disc carrier sleeve 64 by a plurality of circumferentially spaced bolts 66. A radially outwardly extending circumferential flange 68 is rigidly secured to the opposite end of the sleeve 64 and is removably secured to the wheel hub 30 by a plurality of circumferentially spaced bolts 69 (FIG. 4). In addition, a plurality of circumferentially spaced wheel clamps 70 are removably secured to the wheel hub 30 and flange 68 by a plurality of bolts 72. The wheel clamps 70 facilitate securing the wheel rim 24 to the motor 28, as is well known, and also facilitate removal of the wheel rim 24 from the motor 28 when required for replacement or repair of the tire 22. A cover or hub cap 74 may be removably secured to the outer periphery of the brake disc 62 in any suitable conventional manner.

The brakes 46 and 48 may be actuated by any suitable means, electric, pneumatic, hydraulic or otherwise, and are operably connected with a suitable control mechanism (not shown) disposed in the cab section 12 for actuation by the driver of the vehicle 10. When the brakes 46 and 48 are activated, braking pressure is applied simultaneously to the opposite faces of the brake disc 62 by engagement of the braking elements 46 and 48 in a conventional manner. The brake elements 46 and 48 and brake calipers 42 are stationary through the connection with the housing 32, and the brake disc 62 rotates simultaneously with the tire 22 and the wheel rim 24. When the braking elements 46 and 48 are in forced engagement with the brake disc 62, the rotation of the disc 62 will be stopped, which will result in the stopping of the rotation of the wheel rim 24 and tire 20 for providing the braking action for the vehicle 10.

As hereinbefore set forth the brake disc 62 is disposed outboard or radially outwardly of the brake calipers 42 and generally axially outwardly of the wheel hub 30, and is spaced from the wheel rim 24 so that the heat generated by the braking operation is readily dissipated. In addition, the radially outward disposition of the brake disc 62 permits the utilization of the disc 62 having a greater braking area, which further increases the braking efficiency. Also, the speed of rotation of the brake disc 62, rotating at the same speed as wheel 24, is relatively slow, which increases the braking efficiency.

When it is necessary to remove the wheel rim 24 from the motor 28 for any reason, the wheel clamping elements 70 may be disconnected from the motor 28 and the rim 24 may be easily removed for tire repair or replacement. The procedure may be reversed for replacing the wheel rim 24 in operable position on the motor 28.

For severe applications, brake disc 62 may alternatively be mounted in a less confined manner, as shown in FIGS. 5 through 9, to permit circumferential and radial expansion or contraction without possible attendant warping or breakage of either the disc 62 itself or other parts. Referring to FIGS. 5, 8 and 9, one embodiment of such a disc brake 100 is shown. An annular wheel carrier sleeve 110 and clamps 117 are added to the construction of FIG. 3 to replace the wheel clamps 70 and the carrier sleeve 64 of that embodiment and the wheel rim 24 is reversed to accommodate the carrier sleeve 110. The carrier sleeve 110 is attached to the wheel hub 30 by a plurality of bolts 116, and the clamps 117 are mounted at circumferentially spaced locations on studs 118 and secured by nuts 119 (FIG. 9) to operably clamp together the wheel rim, carrier sleeve and wheel hub.

The brake disc, illustrated at 162, is retained in part by a radially inwardly extending support flange 112 on the carrier sleeve 110. As shown in FIGS. 5 and 6a, the brake disc 162 has a plurality of recesses 164 about the periphery thereof, and the carrier sleeve 110 has a plurality of lugs 114 welded thereto (FIG. 9) at interruptions in the flange 112 (not shown) coincident with the recesses 164, so that the lugs 114 are disposed within the recesses 164. The lugs 114 transmit braking forces between the brake disc and the wheel.

Brake disc 162 is loosely retained in position by a plurality of generally U-shaped disc holding elements 120 disposed at locations coincident with the recesses 164 of the disc 162 and having central portions overlying the disc 162. The disc holding elements 120 are secured to the carrier sleeve 110 and the wheel hub 30 by bolts 116 passing through the holes in the ends thereof. Spacers 122 are disposed between the disc holding elements 120 and the carrier sleeve 110 so that the disc 162 will not be tightly clamped. The axial thickness of the spacers 122 may be varied to obtain any desired axial movement of the disc 162.

A hub cap sleeve 75 is also illustrated in FIGS. 5 and 6, attached to the disc 162 at tab flanges 76 by bolts 77. The hubcap 74 may be press fit on to the sleeve as shown in FIG. 5.

Another embodiment of the present invention that can permit limited thermal expansion and contraction is the disc brake 200 shown in FIGS. 7 and 8. A modified annular carrier sleeve 210 is attached to the wheel hub 30 at a plurality of circumferentially spaced locations by bolts 212. The carrier sleeve 210 interfaces with the wheel rim 24 by clamping means 214, comprising a series of studs 216 mounted directly to the carrier sleeve 210 at a plurality of circumferentially spaced locations. A plurality of wheel clamps 218 having an arcuate cross-section (FIG. 7) are disposed across adjacent pairs of bolts 216 (FIG. 8) and are secured by nuts 220. The clamps 218 secure the wheel rim 24 to the wheel hub 30. The carrier sleeve 210 has a radially inwardly extending support flange 222 having tapped holes 224 at circumferentially spaced locations. A retaining ring 226 (FIG. 8a) is attached to the flange 222 of carrier sleeve 210 by a plurality of bolts 232 disposed in holes 224, and has a plurality of internally formed radially inwardly directed lugs 228, each having two holes 230 therethrough.

The brake disc 262, illustrated in FIG. 8b, has a plurality of recesses 264 in the periphery thereof corresponding in number to the number of lugs 228 on the retaining ring 226. The disc 262 is positioned in the same plane as the ring 226, with lugs 228 disposed in recesses 264. The ring and lugs have substantially the same axial thickness as the disc. A pair of disc holding elements 240, illustrated in FIGS. 7 and 8, are positioned on opposite sides of each lug 228 and are mounted thereto by bolts 241 passing through holes 230, and nuts 242. The disc holding elements 240 overlie each lug 228 to limit relative axial movement between the brake disc and retaining ring. The depth of the lugs 228 may be increased or spacers may be employed between the lugs and one or both of the holding elements 240 to obtain any desired axial movement of the disc 262.

Clearance exists between each lug 228 and the corresponding recess 264 to permit thermal expansion and contraction of the disc 262. As in the previous embodiment, the lugs and recesses transmit braking forces between the brake disc and the wheel rim.

The particular embodiments of the invention depicted may be utilized in combination with either a single wheel or dual wheel arrangement, although only a single wheel has been illustrated herein.

Whereas the present invention has been described in particular relation to the drawings attached hereto, it should be understood that other and further modifications, apart from those shown or suggested herein, may be made within the spirit and scope of the invention.

What is claimed is:

1. An improved wheel assembly for large, off-highway vehicles or the like comprising a wheel having a central non-rotatable housing section and a radially outer rotatable wheel section including a rotatable outer hub and a wheel rim, said assembly comprising:
   drive means mounted on said central non-rotatable housing section for transmitting driving forces to said outer wheel section;
   brake caliper means mounted on said central housing section and disposed radially outwardly from the axis of rotation of said outer wheel section, said caliper means opening radially outwardly from said axis of rotation;
   carrier means mounted on said outer hub section between said central non-rotatable housing section and said wheel rim; and
   an annular brake disc supported by said carrier means and operably disposed within and radially outwardly of said brake caliper means,
   said brake caliper means being positioned to contact said brake disc proximate the maximum radius thereof.

2. The assembly of claim 1, wherein said drive means comprises electric motor means mounted on said central housing section and drivingly connected to said outer wheel section to rotationally drive the latter.

3. The assembly of claim 2, wherein said brake disc is disposed radially between said motor means and said wheel rim.

4. The assembly of claim 1, wherein said carrier means is spaced radially inwardly from said wheel rim.

5. The assembly of claim 1, wherein said brake disc is disposed radially inwardly of said carrier means.

6. The assembly of claim 1, wherein said brake disc is mounted on said carrier means at the axially outer edge of said carrier means.

7. The assembly of claim 1, wherein said brake disc is bolted to said carrier means.

8. The assembly of claim 1, wherein said brake disc is mounted for limited movement with respect to said carrier means to permit thermal expansion and contraction of the respective parts.

9. The assembly of claim 8, further comprising means to mount said brake disc to said carrier means for limited relative circumferential movement of said brake disc with respect to said carrier means.

10. The assembly of claim 9, wherein said brake disc has at least one recess in the peripheral edge thereof and said mounting means comprises a lug mounted on said carrier means and disposed in said recess.

11. The assembly of claim 10, wherein said mounting means includes an annular ring having said lug formed integrally therewith.

12. The assembly of claim 11, wherein said mounting means further comprises a pair of holding elements fixed to said ring on opposite sides of said brake disc, said holding elements overlapping said brake disc to axially limit movement of the latter with respect to said carrier means.

13. The assembly of claim 12, wherein the axial thickness of said lug is not less than the axial thickness of said disc.

14. The assembly of claim 10, wherein a plurality of separate lugs are individually affixed to said carrier means and said brake disc is provided with a plurality of recesses in which said lugs are disposed.

15. The assembly of claim 14, further comprising an integral flange on said carrier means for limiting axial movement of said brake disc in one direction with respect to said carrier means and holding means affixed to said carrier means for limiting relative axial movement of said disc in the opposite direction.

16. The assembly of claim 8, wherein one of said carrier means or brake disc has a recess therein and the other has a lug projecting therefrom and disposed in said recess.

17. The assembly of claim 16, further comprising holding means affixed to one of said brake disc or carrier means and overlapping the other, to limit relative axial movement of said brake disc with respect to said carrier means.

18. An improved wheel assembly for large, off-highway vehicles or the like comprising a wheel having a central non-rotatable housing section and a radially outer rotatable wheel section including a rotatable outer hub and a wheel rim, said assembly comprising:
- drive means mounted on said central housing section for transmitting driving forces to said outer wheel section;
- brake caliper means mounted on said central housing section and disposed radially outwardly from the axis of rotation of said outer wheel section, said caliper means opening radially outwardly from said axis of rotation;
- carrier means mounted on said outer hub section between said central housing section and said wheel rim;
- an annular brake disc supported by said carrier means and operably disposed within and radially outwardly of said brake caliper means, said brake disc having a recess in the outer periphery thereof; and
- mounting means for mounting said brake disc to said carrier means for limited relative circumferential movement therebetween, including an annular ring having at least one lug formed integrally therewith and disposed within said recess in said brake disc.

19. An improved wheel assembly for large, off-highway vehicles or the like comprising a wheel having a central non-rotatable housing section and radially outer rotatable wheel section including a rotatable outer hub and a wheel rim, said assembly comprising:
- drive means mounted on said central housing section for transmitting driving forces to said outer wheel section;
- brake caliper means mounted on said central housing section and disposed radially outwardly from the axis of rotation of said outer wheel section, said caliper means opening radially outwardly from said axis of rotation;
- carrier means mounted on said outer hub section between said central housing section and said wheel rim and including a radially inwardly extending support flange;
- an annular brake disc operably disposed within and radially outwardly of said brake caliper means and supported by said carrier means, said support flange limiting axial movement of said disc in one direction with respect to said carrier means, said brake disc having recesses at the outer periphery thereof;
- holding means affixed to said carrier means for limiting relative axial movement of said disc in the opposite direction; and
- at least one lug affixed to said carrier means and disposed in a corresponding recess of said disc,
  whereby said brake disc is mounted for limited movement with respect to said carrier means to permit thermal expansion and contraction of the respective parts.

* * * * *

REEXAMINATION CERTIFICATE (936th)
United States Patent [19]
Bartley

[11] B1 4,282,952
[45] Certificate Issued  Oct. 25, 1988

[54] WHEEL ASSEMBLY

[75] Inventor: Francis A. Bartley, Tulsa, Okla.

[73] Assignee: Unit Rig & Equipment Co., Tulsa, Okla.

Reexamination Reqs:st:
No. 90/001,142, Dec. 12, 1986
No. 90/001,166, Feb. 6, 1987

Reexamination Certificate for:
Patent No.: 4,282,952
Issued: Aug. 11, 1981
Appl. No.: 40,419
Filed: May 18, 1979

Related U.S. Application Data

[63] Continuation-in-part of Ser. No. 846,926, Oct. 31, 1977, abandoned.

[51] Int. Cl.$^4$ .............................................. F16D 55/22
[52] U.S. Cl. .................................... 188/18 A; 180/10; 301/6 E
[58] Field of Search .............. 180/10, 65.5; 188/18 A, 188/72.1, 72.4, 218 XL, 366, 367, 368; 301/6 R, 6 E

[56] References Cited

U.S. PATENT DOCUMENTS

| | | | |
|---|---|---|---|
| 1,968,583 | 7/1934 | Apple | 188/164 |
| 2,835,351 | 5/1958 | Armstrong et al. | |
| 2,926,757 | 3/1960 | Armstrong | |
| 3,115,204 | 12/1963 | Dence | 180/10 |
| 3,249,181 | 5/1966 | Muller | |
| 3,405,784 | 10/1968 | Henry-Biabaud | 188/18 |
| 3,642,101 | 2/1972 | Hauth | 188/73.3 |
| 3,780,834 | 12/1973 | Lottridge et al. | 188/18 A |
| 3,812,928 | 5/1974 | Rockwell et al. | 180/65 F |
| 3,941,221 | 3/1976 | Pringle | 188/218 XL |
| 4,234,236 | 11/1980 | Inbody | 301/6 W |

FOREIGN PATENT DOCUMENTS

| | | |
|---|---|---|
| 839019 | 12/1939 | France |
| 781987 | 8/1957 | United Kingdom |
| 938291 | 10/1963 | United Kingdom |
| 1402535 | 8/1975 | United Kingdom |

OTHER PUBLICATIONS

Goodbary Equipment Company brochure.
U.S. patent application Ser. No. 846,926, now abandoned.

*Primary Examiner*—Duane A. Reger

[57] ABSTRACT

Several embodiments of a wheel assembly for use with large, off-highway vehicles, comprising a drive motor mounted on the wheel hub, and brake calipers cooperating with an annular brake disc supported by a disc carrier which is "outboard" or disposed radially outwardly of the brake calipers, for providing greater heat dissipation and greater braking forces upon the application of braking pressure. In one embodiment, the brake disc is secured to the carrier at its outer periphery by a plurality of circumferentially spaced bolts. In two other embodiments, the brake disc is mounted for limited relative movement with respect to the carrier to accommodate radial and circumferential thermal expansion and contraction in aggravated situations. In one of these other embodiments, the brake disc is retained against excessive circumferential movement relative to the carrier by a plurality of individual lugs affixed to the carrier. In the last embodiment, such movement is prevented by lugs formed integrally with a ring element secured to the carrier.

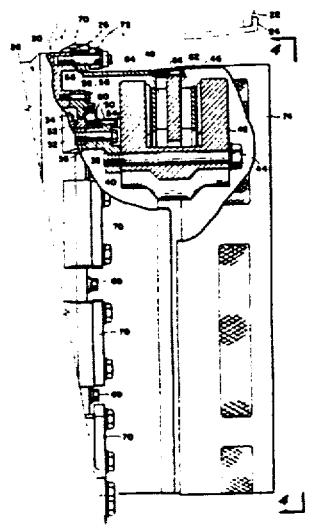

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 18 is confirmed.

Claims 8–10, 14–17, and 19 are cancelled.

Claims 1 and 11 are determined to be patentable as amended.

Claims 2–7, 12 and 13, dependent on an amended claim, are determined to be patentable.

1. An improved wheel assembly for large, off-highway vehicles or the like comprising a wheel having a central non-rotatable housing section and a radially outer rotatable wheel section including a rotatable outer hub and a wheel rim, said assembly comprising:
   drive means mounted on said central non-rotatable housing section for transmitting driving forces to said outer wheel section;
   brake caliper means mounted on said central-housing section *disposed axially outwardly of both the central non-rotatable housing section and the outer hub,* and disposed radially outwardly from the axis of rotation of said outer wheel section, said caliper means opening radially outwardly from said axis of rotation;
   carrier means mounted on said outer hub section between said central non-rotatable housing section and said wheel rim; and
   an annular brake disc supported by said carrier means and operably disposed within and radially outwardly of said brake caliper means, said brake caliper means being positioned to contact said brake disc proximate the maximum radius thereof.

11. [The assembly of claim 10] *An improved wheel assembly for large, off-highway vehicles or the like comprising a wheel having a central non-rotatable housing section and a radially outer rotatable wheel section including a rotatable outer hub and a wheel rim, said assembly comprising:*
   *drive means mounted on said central non-rotatable housing section for transmitting driving forces to said outer wheel section;*
   *brake caliper means mounted on said central housing section and disposed radially outwardly from the axis of rotation of said outer wheel section, said caliper means opening radially outwardly from said axis of rotation;*
   *carrier means mounted on said outer hub section between said central non-rotatable housing section and said wheel rim;*
   *an annular brake disc supported by said carrier means and operably disposed within and radially outwardly of said brake caliper means, said brake caliper means being positioned to contact said brake disc proximate the maximum radius thereof;*
   *wherein said brake disc is mounted for limited movement with respect to said carrier means to permit thermal expansion and contaction of the respective parts; and*
   *further comprising means to mount said brake disc to said carrier means for limited relative circumferential movement of said brake disc with respect to said carrier means;*
   *wherein said brake disc has at least one recess in the peripheral edge thereof and said mounting means comprises a lug mounted on said carrier means and disposed in said recess; and*
   *wherein said mounting means includes an annular ring having said lug formed integrally therewith.*

* * * * *